United States Patent [19]

Rich

[11] 3,818,272

[45] June 18, 1974

[54] AUTOMATIC SWITCHING AND SHORT CIRCUIT PROTECTION CIRCUIT

[75] Inventor: Gerald C. Rich, Santa Cruz, Calif.

[73] Assignee: Rich Laboratories, Inc., Santa Cruz, Calif.

[22] Filed: Nov. 15, 1972

[21] Appl. No.: 306,740

[52] U.S. Cl................ 317/20, 307/66, 317/22, 317/31, 317/33 SC, 317/40 R, 321/14
[51] Int. Cl............................................. H02h 7/14
[58] Field of Search............. 317/20, 40, 22, 33 SC, 317/31; 321/14; 307/66, 64

[56] References Cited
UNITED STATES PATENTS

| | | | |
|---|---|---|---|
| 3,293,446 | 12/1966 | Baude | 307/66 |
| 3,558,983 | 1/1971 | Steen | 317/20 |
| 3,590,323 | 6/1971 | Mapham | 317/22 |
| 3,614,587 | 10/1971 | Schwarz | 321/14 X |

Primary Examiner—James D. Trammell
Attorney, Agent, or Firm—Flehr, Hohbach, Test, Albritton & Herbert

[57] ABSTRACT

A circuit for use with standby power systems requiring automatic starting. One portion of the circuit is for use with silicon controlled rectifier (SCR) inverters and another portion is more general in nature, for use with loads requiring high initial starting current, or presenting short circuits. The circuit provides for recycling and restart in the event of commutation failure in the SCR inverter and recycles automatically and remotely. Commercial power failure produces switching which places a DC power source on a trigger circuit and a switching sequence circuit. The switching sequence circuit provides a low impedance connection from the DC power source to the SCR inverter only in the event that proper commutation occurs and no internal SCR inverter faults are present. Inverter output is directed to a load through an instantaneously acting surge and short circuit protection circuit which automatically removes the load from the output of the inverter in the event a load short circuit occurs and also limits high surge current requirements on the inverter by the load which might otherwise cause commutation failure in the SCR inverter. The surge and short circuit detection circuit automatically connects the load back to the inverter output after a predetermined period of time once having made a disconnection. The circuit ensures proper functioning of the SCR inverter in spite of temporary internal inverter or external load faults by recycling the inverter start until proper commutation occurs and by recycling the load connection until normal load conditions exist.

18 Claims, 4 Drawing Figures

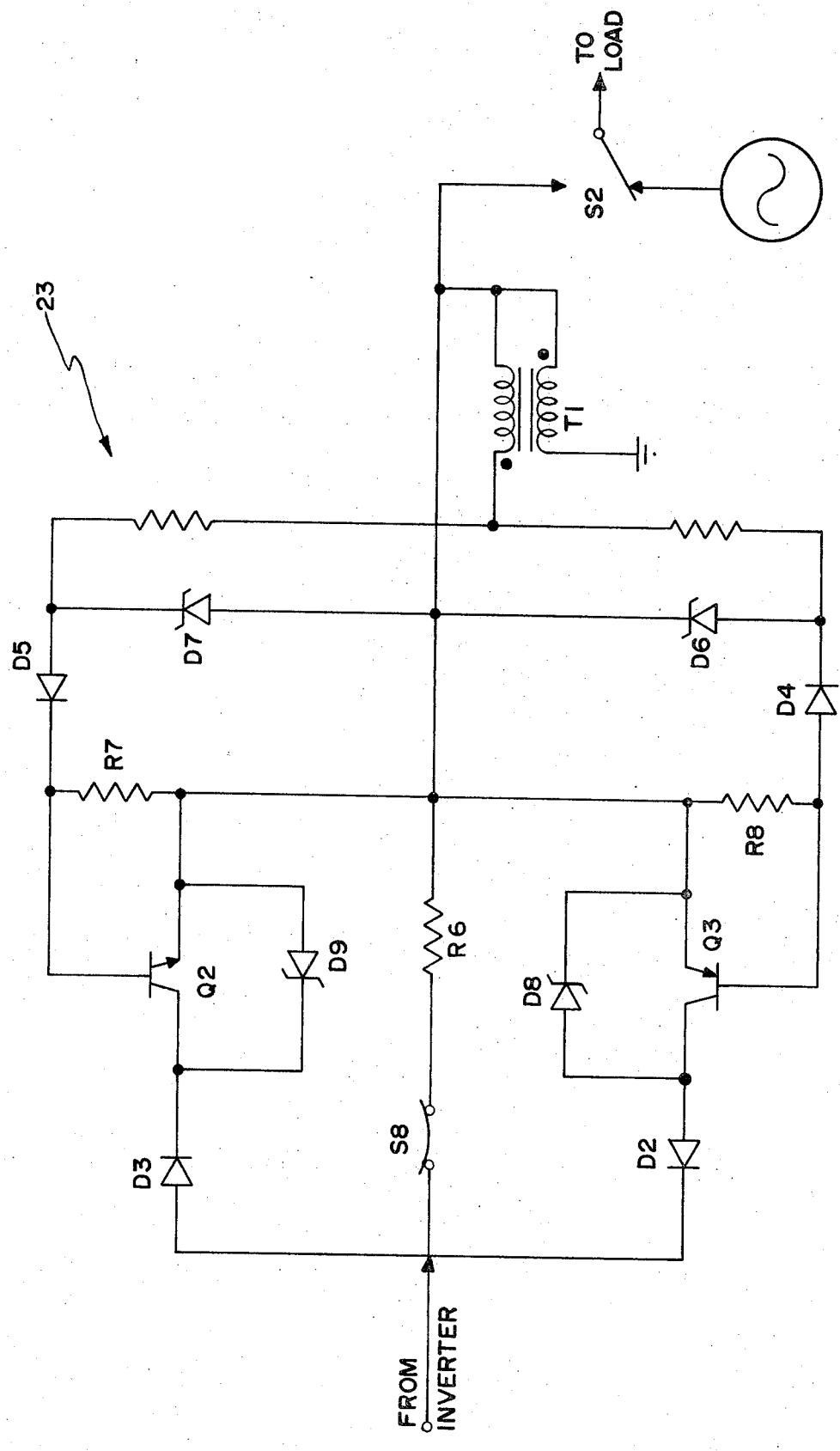

AUTOMATIC SWITCHING AND SHORT CIRCUIT PROTECTION CIRCUIT

BACKGROUND OF THE INVENTION

This invention relates to automatic switching and short circuit protection for standby power systems, and more particularly to automatic and remote switching and short circuit protection for use with such power systems having SCR inverters which may be required to provide high initial surge current to a load.

D.C. powered inverters have been used in the past providing automatic switchover from commercial power to the inverter where such switchover must be automatic and performed remotely when a commercial power failure occurs. Inverters for use in such systems have generally been transistorized due to the associated ease in starting. Transistorized inverters have power limitations thereby requiring a greater number of units to service a given load. SCR inverters on the other hand do not present as severe a power limitation, but most SCR circuit configurations do present problems in automatic and remote initial startup. Commutation may not properly take place during the first half cycle in an SCR inverter because of high residual magnetism in the output transformer resulting in core saturation or because of starting at in inappropriate point in the trigger cycle. Moreover there may be a high starting load to contend with, or a short circuit in the load which if allowed to remain at the output of the standby power system might cause damage to the inverter components or blow the main fuse protecting the DC source requiring manual replacement. Thus it is seen that there is a need for a high power standby system with reliable automatic starting and restarting characteristics under high initial surge or load short circuit conditions and which will provide automatic shut down when the DC power source is discharged to a predetermined level.

SUMMARY AND OBJECTS OF THE INVENTION

In general the automatic switching and short circuit protection circuit described herein operates in conjunction with a DC power source an SCR inverter and a load. A switching sequence circuit is connected between the DC source and the inverter which provides protection for the inverter and the DC source by resetting and recycling the switching sequence in the event of inverter commutation failure, providing automatic shutdown of the inverter when the DC source is discharged to a predetermined level, and switching the load from a failed commercial power line to an energized auxiliary power source. A surge and short circuit protection circuit is connected to the inverter output providing protection for the inverter from faults occurring in the load and limiting current required by high starting loads. The surge and short circuit protection circuit automatically and instantaneously disengages the inverter from the load when a load fault occurs and automatically connects the load back to the inverter output after the passage of a predetermined amount of time. The starting cycle within the SCR inverter recurs automatically at the inverter input until normal inverter operation is realized and the load connect and disconnect occurs automatically at the inverter output until the load presents conditions to the inverter which are not damaging to the inverter. Moreover the DC source is not disconnected by blowing the protective fuse which would require manual fuse replacement.

In general it is an object of the present invention to provide an automatic switching and short circuit protection circuit which is capable of powering a load requiring a high surge current on starting.

Another object of the invention is to provide an automatic switching and short circuit protection circuit which provides instantaneous load short circuit protection for the AC power source.

Another object of the invention is to provide an automatic switching and short circuit protection circuit which automatically and remotely ensures commutation in the SCR inverter at the start.

Another object of the invention is to provide an automatic switching and short circuit protection circuit which provides automatic shutdown of the standby power supply system when the DC power source is a battery and is discharged to a predetermined level.

Another object of the invention is to provide an automatic switching and short circuit protection circuit which provides standby power for a cable television trunk or feeder line when commercial power on the trunk line has failed.

Additional objects and features of the invention will appear from the following description in which the preferred embodiment has been set forth in detail in conjunction with the accompanying drawings.

BRIEF DESCRIPTION OF THE DRAWINGS

FIG. 4 is a detailed circuit diagram of the surge and short circuit protection circuit.

DESCRIPTION OF THE PREFERRED EMBODIMENT

Figure 1:
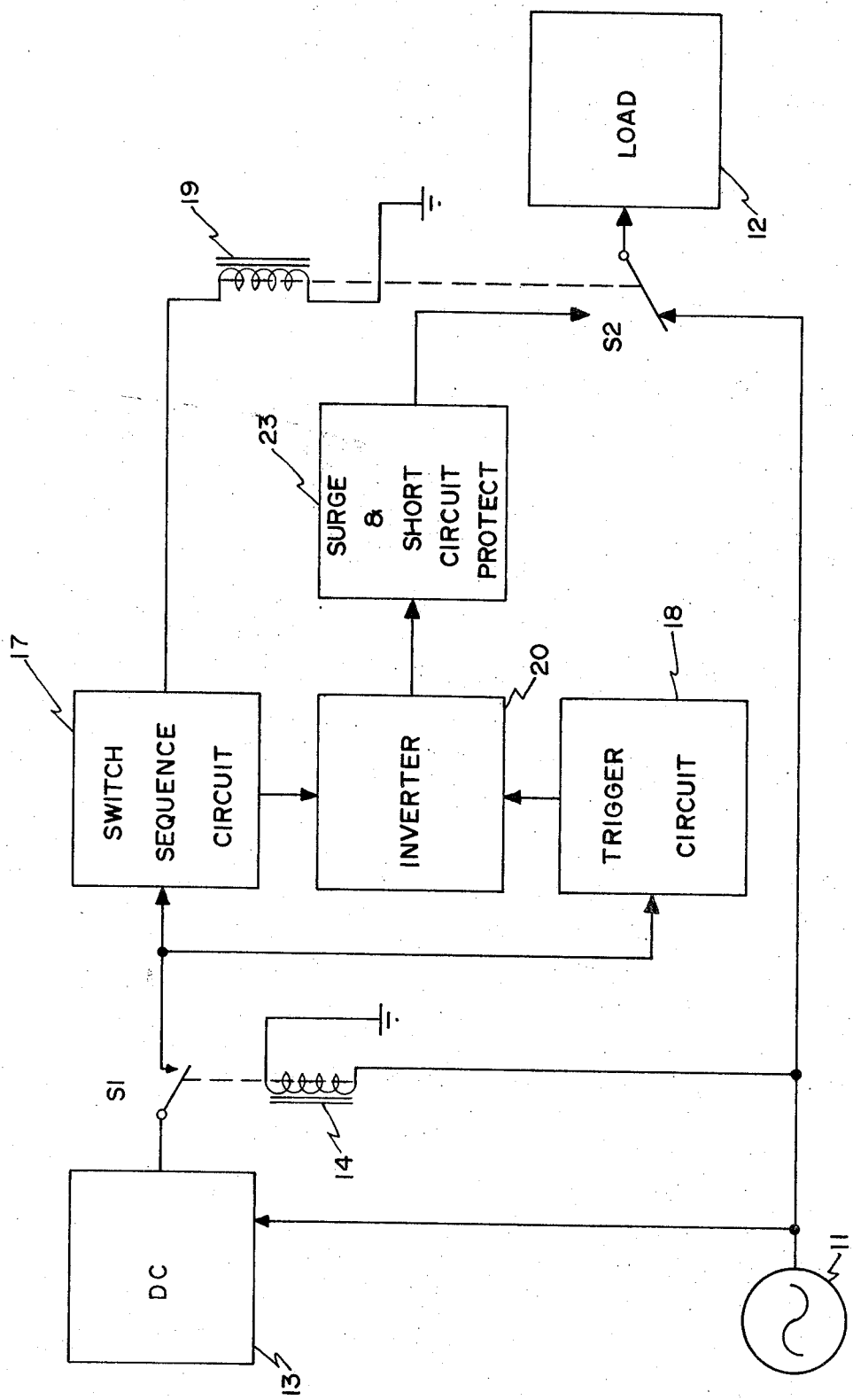
FIG. 1 is a block diagram of the standby power system in conjunction with a commercial power source.

The interrelation between a commercial power supply and a standby power supply with the associated circuits disclosed herein is seen in block diagram form in FIG. 1. A commercial AC power supply 11 is shown providing power to a load 12 through a switch labelled S2 shown in a normal operating position. A DC power source 13, which may be a wet cell battery type supply, is shown in a standby condition. Commercial AC power 11 is utilized to maintain the DC power source 13 in an optimally charged condition at all times. Means for connecting the DC power source 13 to the various sections of the auxiliary power supply system is provided by a time delay relay 14 which is in an energized condition as long as the commercial power supply 11 is operating thus holding switch S1 in an open position.

Switching sequence circuit 17 and trigger circuit 18 are situated to receive the DC power from DC power source 13 when switch S1 closes. A source transfer relay 19 is connected to switching sequence circuit 17 and controls the position of switch S2. An inverter 20 receives the output of switching sequence circuit 17 and trigger circuit 18. In this embodiment the inverter 20 is depicted as a silicon controlled rectifier type inverter. A surge and short circuit protection circuit 23 receives the inverter output providing it to the load 12 when switch S2 is positioned by source transfer relay 19 to do so.

Figure 3:
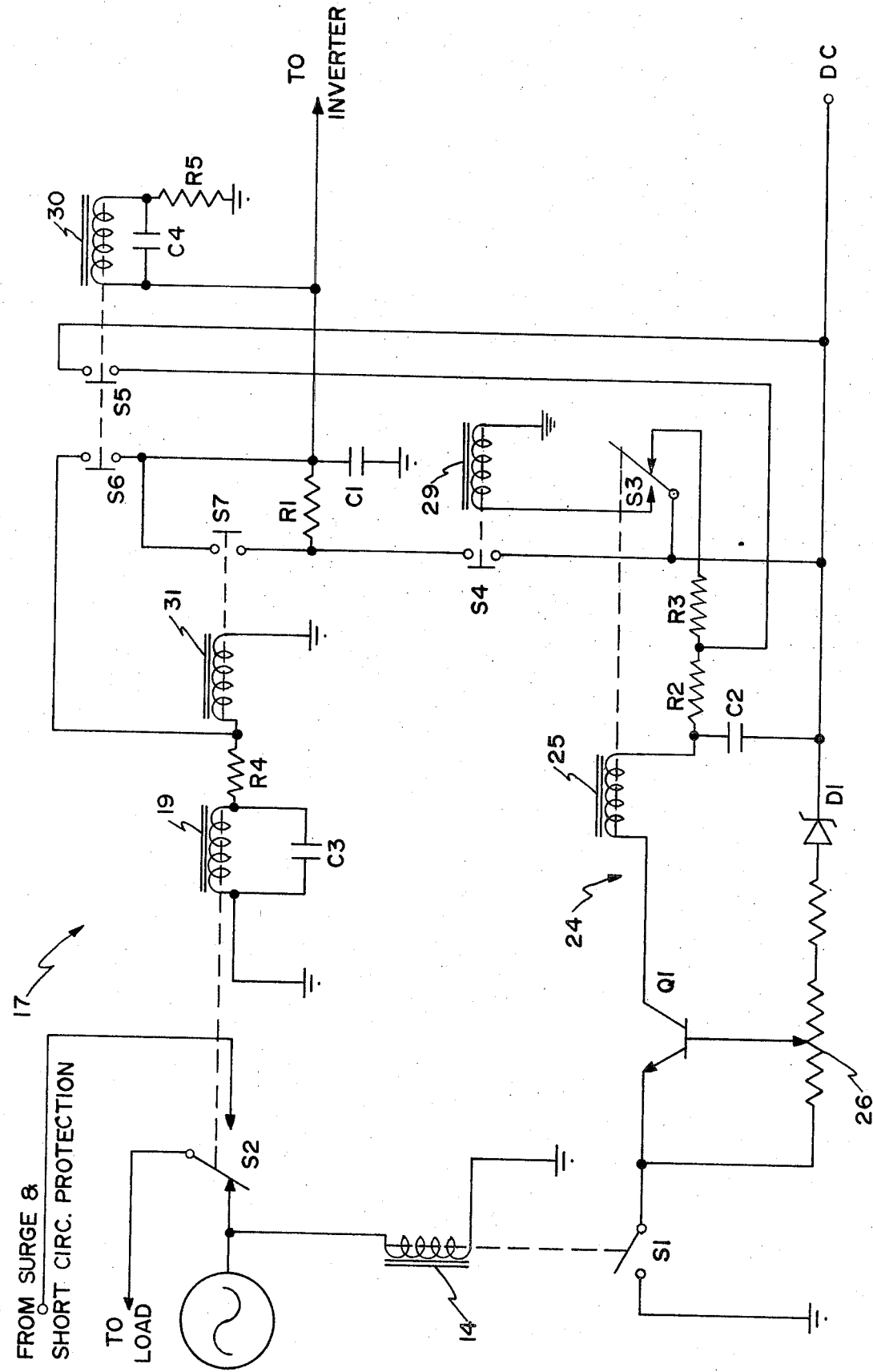
FIG. 3 is a detailed circuit diagram of the switching sequence circuit.

A portion of the switching sequence circuit 17 is an automatic shut down circuit shown generally at 24 in FIG. 3. A sequence recycling capacitor C2 is connected to the DC source 13. A recycle control relay 25 is placed in series with capacitor C2. A voltage sensitive switching device such as transistor Q1 may be included having its collector connected to the other side of recycle control relay 25. The emitter of transistor Q1 is connected to one side of switch S1 which is controlled in position by time delay relay 14. A voltage regulating device such as zener diode D1 is connected from the DC power source 13 to the base circuit of transistor Q1. A potentiometer 26 is provided for fine adjustment of the shut down voltage at the base of transistor Q1.

Recycle control relay 25 controls switch S3 which is shown in the de-energized position in FIG. 3. One side of switch S3 is connected through resistors R3 and R2 to the junction between recycle control relay 25 and capacitor C2. The moving contact of switch S3 is connected to the DC power source 13. The other side of switch S3 is connected to a power relay 29 which actuates a normally open switch S4 in a line from the DC power source 13 to one end of a current limiting resistor R1. The opposite end of limiting resistor R1 is connected at a junction to one side of a filter capacitor C1, one side of a holding relay 30, and the input to SCR inverter 20.

Holding relay 30 actuates normally open switches S5 and S6 respectively in a line from DC power source 13 to the junction of resistors R2 and R3, and in a line from he junction of resistor R1 and capacitor C1 to a junction between source transfer relay 19 and a power shunt relay 31. Power shunt relay 31 actuates a normally open switch S7 in a line which shunts current limiting resistor R1. It can be seen in FIG. 3 that source transfer relay 19 has associated therewith a resistor R4 and capacitor C3 to delay relay closure after voltage is applied. In like manner holding relay 30 has associated capacitor C4 and resistor R5.

The surge and short circuit protection circuit 23 is seen in FIG. 4 and has an input to receive the output from the inverter 20 and an output which is directed to one side of switch S2. A thermal switch S8 is positioned at the input and has a current limiting resistor R6 connected in series, with the other end of resistor R6 connected to one side of switch S2. Surge and short circuit protection circuit 23 can be seen to be symmetrical for the most part and to have first and second parallel paths which are mutually in parallel with the path described by thermal switch S8 and current limiting resistor R6. The first parallel path contains diode D2 connected to the collector of a PNP type transistor Q3. Q3 has a zener diode D8 between the emitter and collector for over-voltage protection. The emitter of transistor Q3 is connected to the output of circuit 23. A diode D4 is in the base circuit of transistor Q3. A zener diode D6 is connected between the emitter and base circuits of transistor Q3. In similar fashion in the second parallel path through circuit 23 a diode D3 is placed between the input of circuit 23 and the collector of a transistor Q2. A zener diode D9 is connected between the collector and emitter of transistor Q2. Q2 is an NPN type device with its emitter connected to the output of circuit 23. A diode D5 is connected in the base circuit of transistor Q2 and a zener diode D7 is connected between the base circuit and the emitter of transistor Q2.

A transformer T1 has its primary connected between the output to circuit 23 and common. The secondary of transformer T1 is connected between the output of circuit 23 and the base circuits of transistors Q2 and Q3. The reference for the secondary voltage on transformer T1 can be seen to be the output voltage from the surge and short circuit protection circuit 23. Bias resistors R7 and R8 are placed in the emitter-base circuits of transistors Q2 and Q3 respectively.

Figure 2:
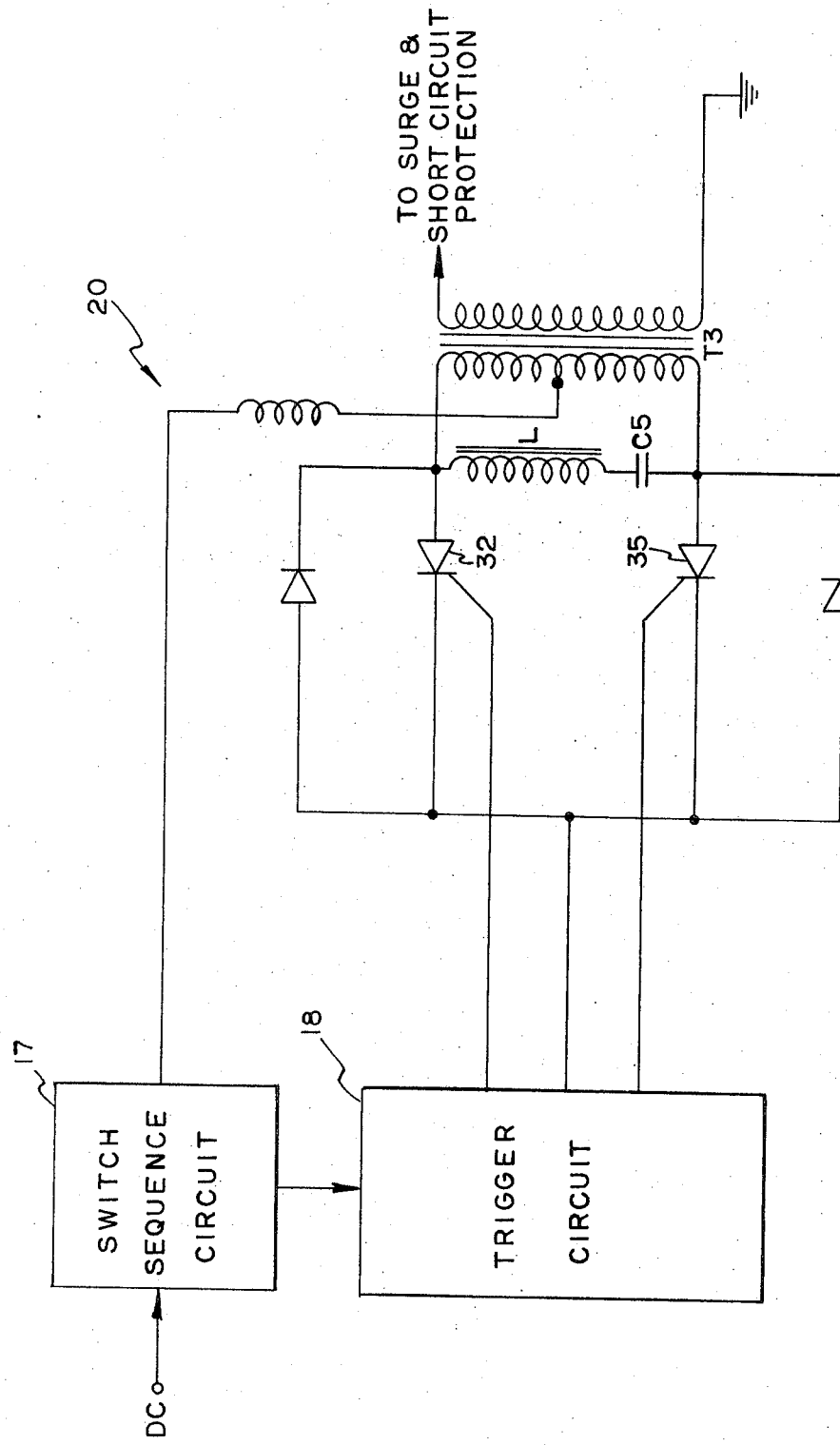
FIG. 2 is a simplified circuit diagram of one type of impulse commutated SCR inverter.

Turning now to the operation of the circuit attention is directed to FIG. 2 for some insight into the operation of one type of SCR inverter. A complimentary, impulse commutated circuit is shown. Silicon controlled rectifiers (SCR) 32 and 35 are seen to be placed in a condition to conduct by signals from the trigger circuit 18 applied to their respective gates in the simplified inverter diagram shown. Ideally when the DC power source is presented to the inverter 20 from the switching sequence circuit 17 the trigger circuit 18 will select one of the SCR devices, for example SCR 32, to conduct. Thus current will flow from the DC power source 13 to the center tap on the primary of transformer T3 and through the winding to pass through SCR 32 to common. As this current flow takes place the capacitor C5 is charged through inductance L. Trigger circuit 18 then enables SCR 35 to conduct with an appropriate signal at its gate and C5 discharges through SCR 35 providing a momentary reverse potential across SCR 32 extinguishing it in the absence of an enabling signal at its gate. Current flow can now be seen to be in the opposite direction through the primary of T3 from the center tap to SCR 35 to common. In the same manner as before capacitor C5 charges in the opposite direction to discharge through SCR 32 when that SCR is rendered conductive by a signal from trigger circuit 18 to extinguish SCR 35 and allow conduction in the direction originally described. In this manner an AC signal is induced in the secondary of transformer T3 which is delivered to the surge and short circuit protection circuits for eventual delivery to the load.

SCR inverters do not always start in an ideal fashion, however, for reasons not generally under control in the design. For example, the output transformer may be in a state of high residual magnetism as the result of conditions at the time of shut-off during former operation. Then the first half cycle of operation may drive the transformer into saturation resulting in very heavy current which cannot be commutated. The load may consist of rectifiers and large filter capacitors resulting in an intial high current surge. Either of these conditions would require a commutating circuit capable of supplying a very high current relative to that required for normal operation at normal design loads. A third condition might be the triggering of one SCR at the very end of a half cycle of a square wave trigger, which would not allow time for the commutating capacitor to charge before the other SCR is triggered.

In all these cases the result is continuous conduction of both SCR's simultaneously and consequently a direct short circuit of the DC source. This is termed commutation failure. It is this type of failure that the described circuits are designed to accomdate.

The switchover from a commercial AC power source 11 to the standby power supply is initiated when the commercial power fails and time delay relay 14 releases. This closes switch S1 and energizes trigger circuit 18 and switching sequence circuit 17. Referring to FIG. 3 it can be seen that recycle control relay 25 is actuated by the charging current through sequence recycling capacitor C2. With the DC power source 13 above a predetermined level, base signal is provided to transistor Q1 which allows Q1 to conduct through switch S1 to common. The predetermined level in DC power source 13 mentioned above is set by adjustment of the potentiometer 26. For example it may not be desirable to utilize DC power source 13, which has a normal 24 volt level, after it has fallen to a level of 18 volts, for fear of permanently damaging the cells in the case of a wet battery source. In such a case the base circuit of transistor Q1 can be adjusted to cause Q1 to stop conducting when DC source 13 reaches a terminal voltage of 18 volts. This would de-energize recycle control relay 25 and prevent further DC power from reaching the input of inverter 20. This feature is termed the automatic shutdown characteristic of the switching sequence circuit 17.

Actuation of recycle control relay 25 positions switch S3 to deliver DC power to power relay 29. Power relay 29 closes switch S4 providing DC power to the inverter 20 through current limiting resistor R1. Recycle control relay 25 and power relay 29 may be the same coil, actuating switches S3 and S4 simultaneously as long as switch S4 contacts are capable of switching the required power level. In the event commutation failure in the inverter, which is described above, presents a short circuit at the output transformer T1, no charge builds up on filter capacitor C1, holding relay 30 is not energized and R1 limits the DC current to a level below the fusing level. As sequence recycling capacitor C2 reaches a charged condition the charging current through recycle control relay 25 drops to a drop-out value and switch S3 to power relay 29 is opened, in turn opening switch S4. This interrupts DC power to the input of inverter 20 extinguishing both SCR's. Switch S3 is now in a position to discharge sequence recycling capacitor C2 through the R2–R3 resistor combination, and upon such discharge the cycle begins anew.

Assuming that the next cycle does not see a commutation failure in inverter 20, a charge builds up on filter capacitor C1 and holding relay 30 is actuated closing switches S5 and S6. Switch S5 provides a path from the DC power source 13 through resistor R2, recycle control relay 25, and transistor Q1 to common, which bypasses sequence recycling capacitor C2, and relay 25 is held closed. Switch S6 when closed puts the voltage on capacitor C1 to the power shunt relay 31 and the source transfer relay 19 closing switches S7 and S2 respectively. Switch S7 provides a shunt path around current limiting resistor R1 placing the DC power source 13 directly on the input of inverter 20. Switch S2 transfers the source for the load 12 from the failed commercial power supply 11 to the now fully operating inverter 20. Resistor R4 and capacitor C3 associated with source transfer relay 19 are present to allow switch S7 to close prior to closure of switch S2. Holding relay 30 and power shunt relay 31 may be the same coil, actuating switches S5, S6 and S7 simultaneously as long as switch S7 contacts are capable of switching the required power level.

It should be noted that time delay relay 14 is configured to delay opening of switch S1 after commercial AC power returns to the line to allow for typical line starting transients to settle out. In this embodiment the delay period may range from a fraction of a minute up to a minute or more. The return of AC power thus opens switch S1 de-energizing the switching sequence circuit 17 causing switch S2 to assume the normal position delivering commercial power to the load.

In the event of a short circuit fault in the load or a load of the type which requires high starting current, the load 12 reflected back through transformer T3 to the inverter 20 may appear as a short circuit. This in turn may cause heavy conduction through SCR's 32 and 35. As described above the high current densities through the SCR's 32 and 35 may create a condition where the energy stored on capacitor C5 will not turn the conducting SCR off, and the other SCR will be turned on by the trigger circuit leaving both SCR's in a conducting condition due to the commutation failure. To prevent this type of occurence and to ease the design requirements of the commutating circuit, the surge and short circuit protection circuit 23 is placed on the output of the inverter 20. As is best seen in FIG. 4 the output of the inverter is caused to pass through thermal switch S8 and current limiting resistor R6 and switch S2 to the load 12. An initial short circuit in the load 12 will not appear as such to the inverter 20 due to the limiting effect of R6. R6 may not be able to continually dissipate the power required to sustain a short circuit in the load 12 and in such a case thermal switch S8 will open after a predetermined period of time disconnecting the load 12 from the output of inverter 20. After another predetermined period of time, for example 30 seconds, thermal switch S8 will close to once again present the output of inverter 20 to the load 12 through the limiting resistor R6. It should be noted that thermal switch S8 is optional if resistor R6 is capable of dissipating current flowing therethrough when the load is short circuited.

Assuming that the load short circuit is no longer present, a potential builds up across the primary of transformer T1 by voltage divider action between resistors R6 and the impedance of load 12. The secondary of transformer T1 is fashioned to provide a signal to the base circuit of both Q2 and Q3 which is slightly higher than the load voltage during a positive half cycle and slightly lower than the load voltage during a negative half cycle. Thus during a positive half cycle transistor Q2 is turned on to conduct from the output of inverter 20 through diode D3, transistor Q2 and switch S2 to the load. In similar manner during a negative half cycle the other parallel path through surge and short circuit protection circuit 23 conducts, in a conventional direction, through transistor Q3, diode D2, and the output of inverter 20.

It can be seen, that the series impedances Q2 and Q3 are controlled by the load voltage. Thus a high initial load current would result in a low load voltage by divider action of R6 and the load impedance and hence a low drive and high impedance for Q2 and Q3. However as the load current decreases the load voltage and the drive of Q2 and Q3 increases cumulatively and these transistors operate essentially at collector saturation throughout their conduction periods, resulting in low voltage drop and minimum power dissipation. The ability to limit the load on the inverter automatically, precludes the necessity for large component commutating circuits.

If at any time during operation of the auxiliary power supply a short circuit should appear across load 12 it can be seen that the voltage would drop to zero across the primary of transformer T1. The secondary output of transformer T1 would also go to zero removing the base signals from transistors Q2 and Q3 causing them to stop conducting essentially instantaneously. At this point the only path from the output of inverter 20 to the load would be through thermal switch S8 and current limiting resistor R6 which would then function as described above, alternately interrupting and connecting the output of inverter 20 to the load 12.

Diodes D2 and D3, and zener diodes D8 and D9 protect transistors Q3 and Q2 respectively from experiencing reverse voltages and junction voltages beyond their designed maxima. Zener diodes D6 and D7 limit the maximum voltage which may be seen between the emitters and the bases of transistors Q3 and Q2 respectively to some value below the maximum design voltage for the transistors. In this embodiment with output voltage of 60 volt peak D8 and D9 have 68 volt breakdown levels for protection of Q2 and Q3 against overvoltage between the emitter and collector which have 80 volt breakdown limitations. The zeners represented by D6 and D7 both have 4 volt regulation levels and are present to protect against load transients. D2 and D3 protect the collectors of transistors Q2 and Q3 from reverse voltage during their nonconducting half cycles.

It can be seen that the disclosed invention provides a standby power supply with high power capabilities characteristic of SCR inverters, and also circuitry designed to circumvent characteristic SCR inverter shortcomings. Commutation failure in the inverter initiated by high starting loads or load short circuits is sensed instantaneously and automatic and remote recycling is initiated. Protection of the SCR inverter for faults occurring in the load is provided by the surge and short circuit protection circuit. Faults occurring internally in the inverter are corrected through recycling by the switching sequence circuit which also provides for automatic shutdown of standby power supply when the DC power source reaches a predetermined low level. Fuses protecting DC power source equipment are seldom blown which means on site manual replacement in the remote power supplies is minimized.

I claim:

1. An automatic switching and short circuit protection circuit for use with standby power system utilizing a DC power source for providing auxiliary power to a load in the event of commercial power failure comprising an inverter; a switching sequence circuit connected to said inverter for switching the load between commercial and auxiliary power, said switching sequence circuit being responsive to inverter commutation failure thereby operating to reset and recycle the switching sequence for automatically shutting down and restarting the inverter in the event of commutation failure; a trigger circuit connected to said inverter for actuating said inverter; means for connecting the DC power source to said switching sequence and trigger circuits actuated by commercial power failure; and a surge and short circuit protection circuit for receiving the inverter output and providing substantially immediate disconnection of said inverter from the load upon the occurrence of load faults and high starting loads.

2. An automatic switching and short circuit protection circuit as in claim 1 wherein said switching sequence circuit comprises an automatic shutdown circuit for sensing inverter commutation failure, a power relay actuated by said automatic shutdown circuit, a normally open switch actuated by said power relay, a current limiting resistor connected to the DC power source through said normally open switch for limiting high surge or short circuit currents, a power shunt relay for by-passing said current limiting resistor, a source transfer relay for switching the load from commercial power to standby inverter power, and a holding relay operated by the voltage level at the input to said inverter for actuating said power shunt relay and said source transfer relay in the absence of short circuit or high surge current conditions in the inverter.

3. An automatic switching and short circuit protection circuit as in claim 1 wherein said switching sequence circuit comprises an automatic shutdown circuit for sensing inverter commutation failure, a normally open switch actuated by said automatic shutdown circuit, a current limiting resistor connected to the DC power source through said normally open switch for limiting high surge or short circuit currents, a power shunt switch for by-passing said current limiting resistor, a source transfer relay for switching the load from commercial power to standby inverter power, and a holding relay operated by the voltage level at the input to said inverter for actuating said power shunt switch and said source transfer relay in the absence of short circuit or high surge current conditions in the inverter.

4. An automatic switching and short circuit protection circuit as in claim 3 wherein said automatic shutdown circuit comprises a sequence recycling capacitor connected to the DC power source, a normally open shunt path in parallel with said sequence recycling capacitor and closed by actuation of said holding relay, a recycle control relay in series with said sequence recycling capacitor, whereby when said means for connecting the DC power source to the switching means is actuated by commercial power failure the recycle control relay is actuated by the charging current through the sequence recycling capacitor closing the circuit from the DC power source to said current limiting resistor and the recycle control relay remains actuated by current conducted through said path shunting said sequence recycling capacitor, said recycle control relay being deenergized when charging current through said sequence recycling capacitor falls below a predetermined level prior to actuation of the holding relay.

5. An automatic switching and short circuit protection circuit as in claim 4 wherein said automatic shutdown circuit includes a voltage sensitive switch connected to said recycle control relay, said switch operating to disconnect the DC power source from the switching sequence circuit removing power from said inverter when the DC power source falls below a predetermined level.

6. An automatic switching and short circuit protection circuit as in claim 5 wherein said voltage sensitive switch comprises a transistor, a regulator connected to said DC power source for maintaining a specified voltage in the base circuit of said transistor, and adjusting means at the base of said transistor for fine shutdown base voltage adjustment.

7. An automatic switching and short circuit protection circuit as in claim 1 wherein said means for connecting said DC power source to said switching sequence and trigger circuits comprises a relay energized by the commercial power holding said switching sequence and trigger circuits open whereby said relay connects said circuits to said DC power source when commercial power is interrupted, and a time delay circuit adjustable to delay connection of the commercial power to the load after the relay has once been deenergized, said time delay operating to continue inverter power to the load until time has passed in which initial commercial power transients occur.

8. An automatic switching and short circuit protection circuit for use with standby power systems utilizing a DC power source for providing auxiliary power to a load in the event of commercial power failure comprising an inverter; a switching sequence circuit connected to said inverter for switching the load between commercial and auxiliary power; a trigger circuit connected to said inverter; means for connecting the DC power source to said switching sequence and trigger circuits, actuated by commercial power failure; and a surge and short circuit protection circuit for receiving the inverter output and providing protection for the inverter from load faults and high starting loads wherein said surge and short circuit protection circuit comprises an input for receiving the output from said inverter, an output connected to said load, a current limiting resistor in series with said input and output, first and second conducting paths in parallel with said current limiting resistor, voltage sensitive switching means in said first and second conducting paths, means for generating a switching signal responsive to load voltage connected to said first and second conducting paths for actuating said voltage sensitive switching means and providing alternate conduction in said first and second conducting paths of opposite polarities substantially in phase with said inverter output and immediately blocking conduction through said first and second paths when the load presents a sustained high current surge or short circuit condition.

9. An automatic switching and short circuit protection circuit as in claim 8 together with a recycling thermal switch in series with said current limiting resistor, and time sensitive means incorporated in said thermal switch, said switch operating to open the circuit through said current limiting resistor when the load draws surge or short circuit current for a predetermined length of time and keeping the switch contacts open for a predetermined length of time when once opened.

10. An automatic switching and short circuit protection circuit as in claim 8 wherein said means for generating a switching signal comprises a transformer having a primary winding in parallel with said load, and a secondary winding connected to said voltage sensitive switching means.

11. A switching sequence circuit for automatically and remotely starting silicon controlled rectifier inverters having an input and an output adapted to be connected to a DC power source comprising an automatic shutdown circuit, for sensing inverter commutation failure, a power switch connected to said DC source actuated by said shutdown circuit, a current limiting resistor connected to said power switch for limiting high surge or short circuit currents, a power shunt relay for by-passing said current limiting resistor, a source transfer relay for switching the load to the inverter output, and a holding relay operated by the inverter input voltage for actuating said power shunt relay and said source transfer relay in the absence of short circuit or high current conditions in the inverter.

12. A switching sequence circuit as in claim 11 wherein said automatic shutdown circuit comprises a sequence recycling capacitor connected to the DC power source, a normally open shunt path in parallel with said sequence recycling capacitor closed by actuation of said holding relay, a recycle control relay in series with said sequence recycling capacitor, whereby when the DC power source is connected to the switching sequence circuit the recycle control relay is actuated by the charging current through the sequence recycling capacitor closing the circuit from the DC power source to said current limiting resistor, actuating said holding relay, which closes said normally open shunt path causing said recycle control relay to remain actuated by current conducted through said shunt path, said recycle control relay being deenergized when charging current through said sequence recycling capacitor falls below a predetermined level prior to actuation of the holding relay.

13. A switching circuit as in claim 12 wherein said automatic shutdown circuit includes a voltage sensitive switch connected in series with said recycle control relay, said voltage sensitive switch operating to disconnect the DC power source from the switching sequence circuit thereby removing input power from said inverter when the DC power source voltage falls below a predetermined level.

14. A switching sequence circuit as in claim 13, wherein said voltage sensitive switch comprises a transistor, a regulator connected to said DC power source for maintaining a specified DC shutdown voltage in the base circuit of said transistor, adjusting means at the base of said transistor for fine DC shutdown voltage adjustment.

15. A surge and short circuit protection circuit for use with loads which require high initial surge current or which present load faults of a potentially damaging magnitude to a power source comprising an input for receiving the output from said power source, an output connected to said load, a current limiting resistor in series with said input and output for performing a voltage division function in conjunction with the load, first and second conducting paths in parallel with said current limiting resistor, first and second transistors in said first and second conducting paths respectively, means connected to said first and second conducting paths for actuating said first and second transistors connected to the voltage derived from the load side of said current limiting resistor for causing alternate conduction in said first and second conducting paths of opposite polarity substantially in phase with said inverter output, and immediately blocking conduction through said first and second conducting paths when the load presents a sustained high starting load or a short circuit.

16. A surge and short circuit protection circuit as in claim 15 together with a recycling thermal switch in series with said current limiting resistor, and time sensitive means incorporated in said thermal switch, said switch operating to open the circuit through said current limiting resistor for protecting said current limiting resistor when the load draws surge or short circuit current for a predetermined length of time and keeping the switch contacts open for a predetermined length of time once opened.

17. A surge and short circuit protection circuit for use with loads which require high initial surge current or which present load faults of a potentially damaging magnitude to a power source comprising an input for receiving the output from said power source, an output connected to said load, a current limiting resistor in series with said input and output, first and second conducting paths in parallel with said current limiting resistor, signal sensitive switching means in said first and second conducting paths, means for generating a switching signal connected to said first and second conducting paths for actuating said signal sensitive switching means causing alternate conduction in said first and second conducting paths of opposite polarity substantially in phase with said inverter output, and immediately blocking conduction through said first and second conducting paths when the load presents a sustained high starting load or a short circuit wherein said means for generating a switching signal comprises a transformer having a primary winding in parallel with said load, and a secondary winding connected to said signal sensitive switching means.

18. An automatic switching and short circuit protection circuit for use with standby power systems of the power inverter type utilizing a DC power source for providing auxiliary power to a load in the event of commercial AC power failure comprising a switching sequence circuit connected between the DC power source and the power inverter input for connecting the DC power source to the inverter input and switching the load between commercial AC power and auxiliary AC power, said switching sequence circuit being responsive to inverter commutation failure thereby operating to reset and recycle the switching sequence for restarting the inverter when commutation failure occurs, said switching sequence circuit operating to disconnect the commercial AC power source from the load and to connect the inverter power source to the load upon commercial AC power failure, and a surge and short circuit protection circuit connected between the power inverter output and the load for providing substantially immediate disconnection of said inverter from the load at any point in said inverter power output cycle when load faults and high starting loads occur.

* * * * *